(12) United States Patent
Nishikawa

(10) Patent No.: US 7,872,880 B2
(45) Date of Patent: *Jan. 18, 2011

(54) SWITCH MODE POWER SUPPLY

(75) Inventor: Yukihiro Nishikawa, Hino (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 239 days.

This patent is subject to a terminal disclaimer.

(21) Appl. No.: 12/216,915

(22) Filed: Jul. 11, 2008

(65) Prior Publication Data

US 2009/0027927 A1    Jan. 29, 2009

(30) Foreign Application Priority Data

Jul. 13, 2007    (JP) .............................. 2007-183891

(51) Int. Cl.
H02M 3/335    (2006.01)

(52) U.S. Cl. .................................. 363/21.08; 363/21.04

(58) Field of Classification Search ................... 363/16, 363/20, 21.01, 21.04, 21.08, 50, 56.01
See application file for complete search history.

(56) References Cited

U.S. PATENT DOCUMENTS

| | | | | |
|---|---|---|---|---|
| 5,126,931 A * | 6/1992 | Jitaru | ........................ | 363/21.04 |
| 5,610,804 A * | 3/1997 | Shimizu | .................. | 363/21.16 |
| 6,469,913 B2 | 10/2002 | Hosotani et al. | | |
| 6,631,082 B2 * | 10/2003 | Birumachi | .................... | 363/97 |
| 6,917,528 B2 | 7/2005 | Abe et al. | | |
| 7,042,739 B2 * | 5/2006 | Nagai et al. | ............... | 363/21.06 |
| 7,525,822 B2 * | 4/2009 | Aso et al. | ................. | 363/21.06 |
| 7,596,003 B2 * | 9/2009 | Nishikawa | ............... | 363/21.04 |
| 2007/0047267 A1 | 3/2007 | Nishikawa | | |

FOREIGN PATENT DOCUMENTS

| | | |
|---|---|---|
| JP | 2002-112544 | 4/2002 |
| JP | 2004-130914 | 4/2004 |
| JP | 2004-153948 | 5/2004 |
| JP | 2007-068359 | 3/2007 |

\* cited by examiner

*Primary Examiner*—Matthew V Nguyen
(74) *Attorney, Agent, or Firm*—Rabin & Berdo, PC

(57) ABSTRACT

A switch mode power supply according to the invention that can improve the reliability thereof includes a series circuit connected between the positive and negative electrodes of a DC power supply 3, the series circuit including a capacitor 4, a main switching device 1, and a subsidiary switching device 2; a main control circuit 13; a subsidiary control circuit 10; control circuits 13 and 10 turning main switching device 1 and subsidiary switching device 2 alternately ON and OFF to obtain a DC output via a transformer 6; and subsidiary control circuit 10 preventing a voltage exceeding the gate breakdown voltage of subsidiary switching device 2 from being applied to the gate electrode of subsidiary switching device 2.

7 Claims, 7 Drawing Sheets

SWITCH MODE POWER SUPPLY

FIELD OF THE INVENTION

The present invention relates to a switch mode power supply that obtains a DC output insulated from a DC power supply.

BACKGROUND

FIG. 5 is a circuit diagram of a conventional electric power converter that obtains a DC output insulated from a DC power supply. The conventional electric power converter shown in FIG. 5 has a circuit configuration almost the same with the circuit configurations of the switch mode power supply apparatuses disclosed in Unexamined Patent Application Publication JP 2004-153948 A (U.S. Pat. No. 6,917,528 B2) and Unexamined Patent Application Publication JP 2007-0683597 A (US 2007/0047267 A1). In the circuit shown in FIG. 5, a main switching device (low-side switching device) 1 and a subsidiary switching device (high-side switching device) 2 repeat switching ON and OFF alternately. During the OFF-period of main switching device 1, the circuit shown in FIG. 5 releases the excitation energy stored in an insulation transformer (hereinafter referred to simply as a "transformer") 6 during the ON-period of main switching device 1 to feed DC electric power to a not-shown load. In FIG. 5, a DC power supply 3 is shown.

Now the operations of the circuit shown in FIG. 5 will be described with reference to FIG. 6 and in connection with metal oxide semiconductor field-effect transistors (hereinafter referred to as "MOSFET's") employed for main and subsidiary switching devices 1 and 2. In FIG. 6, VGS1, VDS1, and ID1 designate the voltage between the gate and source of main switching device 1, the voltage between the drain and source thereof, and the drain current thereof, respectively. In FIG. 6, VGS2, VDS2, and ID2 designate the voltage between the gate and source of subsidiary switching device 2, the voltage between the drain and source thereof, and the drain current thereof, respectively. In FIG. 6, IDr designates the current of a rectifying diode 8 shown in FIG. 5.

Below, the wave chart in FIG. 6 is divided by time points t1, t2, t3, t4, t40, t5, and t6 into states 1 through 7 and the operations of the conventional electric power converter in state 1 through state 7 between the adjacent time points will be described.

State 1: t1-t2

As the gate input capacitance of main switching device 1 is charged via a resistor 18 with a voltage generated across a third winding 6f and the voltage VGS1 between the gate and source of main switching device 1 exceeds a threshold VGS(th), main switching device 1 is turned ON. The side of third winding 6f opposite to the resistor 18 is connected to the positive side of power supply 3 via resistor 19 and to the negative side of power supply 3 via capacitor 22. In the state in which the body diode of main switching device 1 is conductive such that VDS1 is zero, main switching device 1 conducts zero-voltage turn-ON. The drain current ID1 of main switching device 1, that is equal to the exciting current of transformer 6, increases linearly. Since the voltage VGS2 between the gate and source of subsidiary switching device 2 is negative due to the voltage generated across a fourth winding 6b, subsidiary switching device 2 is in the OFF-state thereof.

State 2: t2-t3

As the voltage generated across a resistor 17 by the drain current ID1 of main switching device 1 exceeds the voltage between the base and emitter of a transistor 21, transistor 21 is turned ON. As transistor 21 is turned ON, the gate input capacitance of main switching device 1 is discharged via a diode 20 and transistor 21, main switching device 1 is turned OFF, VDS1 rises and VDS2 falls. As VDS1 rises, the voltage across fourth winding 6b starts rising.

State 3: t3-t4

Diode 8 becomes conductive and the excitation energy stored in transformer 6 is released to the secondary side. The voltage across fourth winding 6b keeps rising and changes from negative to positive.

State 4: t4-t40

As the voltage across fourth winding 6b exceeds the gate threshold VGS(th) of subsidiary switching device 2 to the higher side, subsidiary switching device 2 conducts zero-voltage turn-ON in the state, in which a current is flowing through the body diode thereof.

State 5: t40-t5

As all the excitation energies stored in transformer 6 are released, diode 8 becomes OFF and the voltage across fourth winding 6b starts falling.

State 6: t5-t6

As the voltage across fourth winding 6b exceeds the gate threshold VGS(th) of subsidiary switching device 2 to the lower side, subsidiary switching device 2 is turned OFF, VDS2 rises, and VDS1 falls.

State 7: t6-

VDS1 becomes zero and VDS2 is the voltage of DC power supply 3. Subsequently, the switch mode power supply returns to the operation of state 1 and repeats the operations in state 1 through state 7, resulting in a self-oscillation.

Since both the main and subsidiary switching devices in the circuit shown in FIG. 6 conduct zero-voltage turn-ON, any turn-ON loss is not caused. Moreover, the excitation energies stored in the transformer leakage inductance and a reactor 5 are regenerated to the DC power supply or to the secondary side during the turn-OFF of any of main and subsidiary switching devices 1 and 2. Therefore, an electric power converter that exhibits low losses and a high conversion efficiency is realized.

However, it is necessary to design the circuit that drives the subsidiary switching device thereof by the auxiliary (fourth) winding of a transformer so that the voltage applied between the gate and source of the subsidiary switching device may not exceed the gate breakdown voltage of the subsidiary switching device. When the subsidiary switching device is a MOSFET, the gate breakdown voltage thereof is around ±30 V generally.

Immediately after DC power supply 3 is fed and main switching device 1 starts switching, the voltage across a capacitor 4 is zero. Therefore, the maximum value VGSmax of the voltage between the gate and source of subsidiary switching device 2 is expressed by the following formula (1).

$$VGSmax = (\text{Voltage of DC power supply 3}) \times (\text{Number of turns in auxiliary winding } 6b) \div (\text{Number of turns in a first winding } 6a) \quad (1)$$

At some instances other than the start, the voltage as described by the formula (1) is applied between the gate and source of subsidiary switching device 2. When DC power supply 3 is obtained by rectifying a commercial AC power supply, DC power supply 3 is different from country to country, since the AC power supply voltage is different from country to country. If one wants to obtain a switch mode power supply employable under an AC power supply voltage in any country, the range of the voltage across DC power supply 3 will be inevitably wide. For example, the DC power supply voltage in the area, in which the AC power supply voltage is 240 V, is more than twice as high as the DC power supply voltage in the area, in which the AC power supply voltage is 100 V. As the formula (1) clearly indicates, it is very hard to design the number of turns in auxiliary winding 6*b* so that VGSmax may not exceed the gate breakdown voltage over the entire voltage range of DC power supply 3. For obviating this problem, a Zener diode is connected between the gate and source of the subsidiary switching device to clamp the voltage between the gate and source of the subsidiary switching device with the Zener voltage.

When the voltage between the gate and source of the subsidiary switching device is clamped as described above, a current flows through the Zener diode via a resistor 16 connected to the gate terminal of the subsidiary switching device. As the resistance value of resistor 16 is larger, the gate voltage rises more slowly when the subsidiary switching device is turned ON, causing conduction loss increase in the subsidiary switching device. When the subsidiary switching device is turned OFF, the gate voltage falls slowly, causing turn-OFF loss increase. Therefore, the resistance value of resistor 16 is set from several tens Ω to several hundreds Ω generally. However, when the resistance value of resistor 16 is set from several tens Ω to several hundreds Ω, the problems which impair the reliability of the switch mode power supply are caused. The problems include, for example, a current flowing through the Zener diode that is much higher than the rated current. The problems include also a clamped voltage higher than the Zener voltage described in a data sheet and high enough to exceed the breakdown voltage of the control (gate) terminal of the subsidiary switching device.

For obviating the problems described above, the switch mode power supply disclosed in the JP 2007-0683597 A and described in FIG. 5 attached to the description of the present invention employs a subsidiary control circuit 200*a* as shown in FIG. 7 and comprising transistor 201, diode 202, Zener diode 203 and resistor 204, to prevent positive and negative over voltages from being applied to the control (gate) terminal of the subsidiary switching device. However, the circuit described in FIG. 7 makes transistor 107 work against a negative over voltage and transistor 201 work against a positive over voltage. Therefore, the circuit described in FIG. 7 employs many constituent parts that add to the manufacturing costs of the switching device.

In view of the foregoing, it would be desirable to obviate the problems described above. It would also desirable to provide a very reliable and inexpensive switch mode power supply that can control the control terminal voltage of a subsidiary switching device to be lower than the gate breakdown voltage over a wide DC input voltage range and in many operation modes.

SUMMARY OF THE INVENTION

According to an aspect of the invention for achieving the objects described above, there is provided a switch mode power supply including:

a DC power supply;

a series circuit connected between the positive electrode and the negative electrode of the DC power supply, the series circuit including a main switching device and a subsidiary switching device connected in series to each other;

an insulation transformer including a first winding on the primary side thereof and a second winding on the secondary side thereof, the first winding being disposed between the positive electrode of the DC power supply and the connection point of the main switching device and the subsidiary switching device, the first winding being connected to the positive electrode of the DC power supply via a series circuit including a capacitor and a reactor, the second winding being connected to a load via a rectifying and smoothing circuit;

a main control circuit controllably turning ON and OFF the main switching device;

a subsidiary control circuit controllably turning ON and OFF the subsidiary switching device;

the main control circuit and the subsidiary control circuit turning ON and OFF the main switching device and the subsidiary switching device alternately for converting the voltage generated across the second winding to DC electric power via the rectifying and smoothing circuit and for feeding the DC electric power to the load;

the insulation transformer further including a third winding and a fourth winding on the primary side thereof;

the main control circuit employing the voltage across the third winding as a signal voltage for turning ON and OFF the main switching device to set the DC voltage fed to the load at a certain value, the main control circuit employing the voltage obtained by rectifying and smoothing the voltage across the third winding as a control power supply; and the subsidiary control circuit including a transistor and a Zener diode, the subsidiary control circuit controlling the transistor for applying lower one of the voltage across the fourth winding and the Zener voltage of the Zener diode to the control terminal of the subsidiary switching device, the lower one of the voltage across the fourth winding and the Zener voltage being equal to or higher than zero volts.

Since it is possible to control the voltage at the control terminal of the subsidiary switching device according to the invention, the voltage applied to the subsidiary switching device never exceeds the gate breakdown voltage thereof over the entire operation range independently of the DC power supply voltage range and the switching devices' operations. Therefore, a very reliable switch mode power supply is obtained with low manufacturing costs.

DETAILED DESCRIPTION

Figure 1:
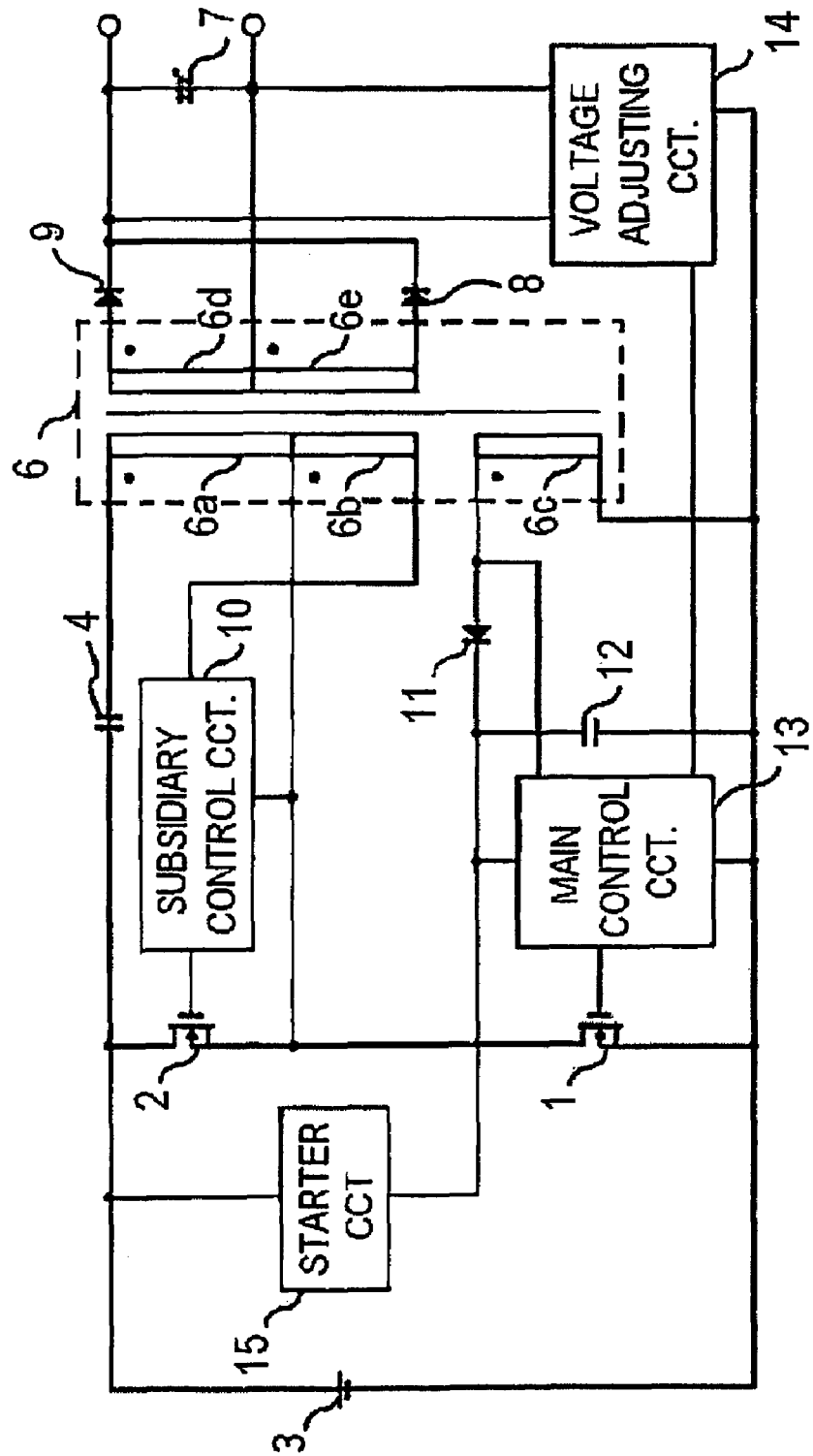
FIG. 1 is a block circuit diagram showing the circuit configuration of a switch mode power supply according to an embodiment of the invention.

FIG. 1 is a block circuit diagram showing the circuit configuration of a switch mode power supply according to an embodiment of the invention. Referring now to FIG. 1, a starter circuit 15 initially charges a capacitor 12 that feeds a control power supply to a main control circuit 13. Starter circuit 15 is formed of resistors or a switching circuit. As capacitor 12 is charged such that the voltage thereof is high enough to make main circuit 13 work, main control circuit 13 feeds a starting pulse to main switching device 1. As main control circuit 13 feeds the starting pulse, the switch mode power supply starts oscillating. After the switch mode power supply starts oscillating, main control circuit 13 turns main switching device 1 ON at the timing, at which the voltage generated across third winding 6c in transformer 6 changes from negative to positive. And, main control circuit 13 turns main switching device 1 OFF based on the feedback signal outputted from a voltage adjusting circuit 14 to set the DC voltage fed to a load connected across a secondary-side capacitor 7 to be constant. It will be appreciated by those skilled in the art that, although transformer 6 is shown as an insulated transformer, it would also be possible to practice the invention using an autotransformer.

Alternatively, the timing, at which the voltage across third winding 6c changes from positive to negative, is set as the maximum ON-pulse width of main switching device 1 and main switching device 1 is turned OFF at the end of the maximum ON-pulse width. The polarity of the voltage across each winding in transformer 6 is defined as described below. The voltage generated toward the dot indicating the start of turning the winding is positive. The voltage obtained by smoothing the voltage generated across third winding 6c by a diode 11 and capacitor 12 is fed to main control circuit 13 as the control voltage thereof.

Figure 5:
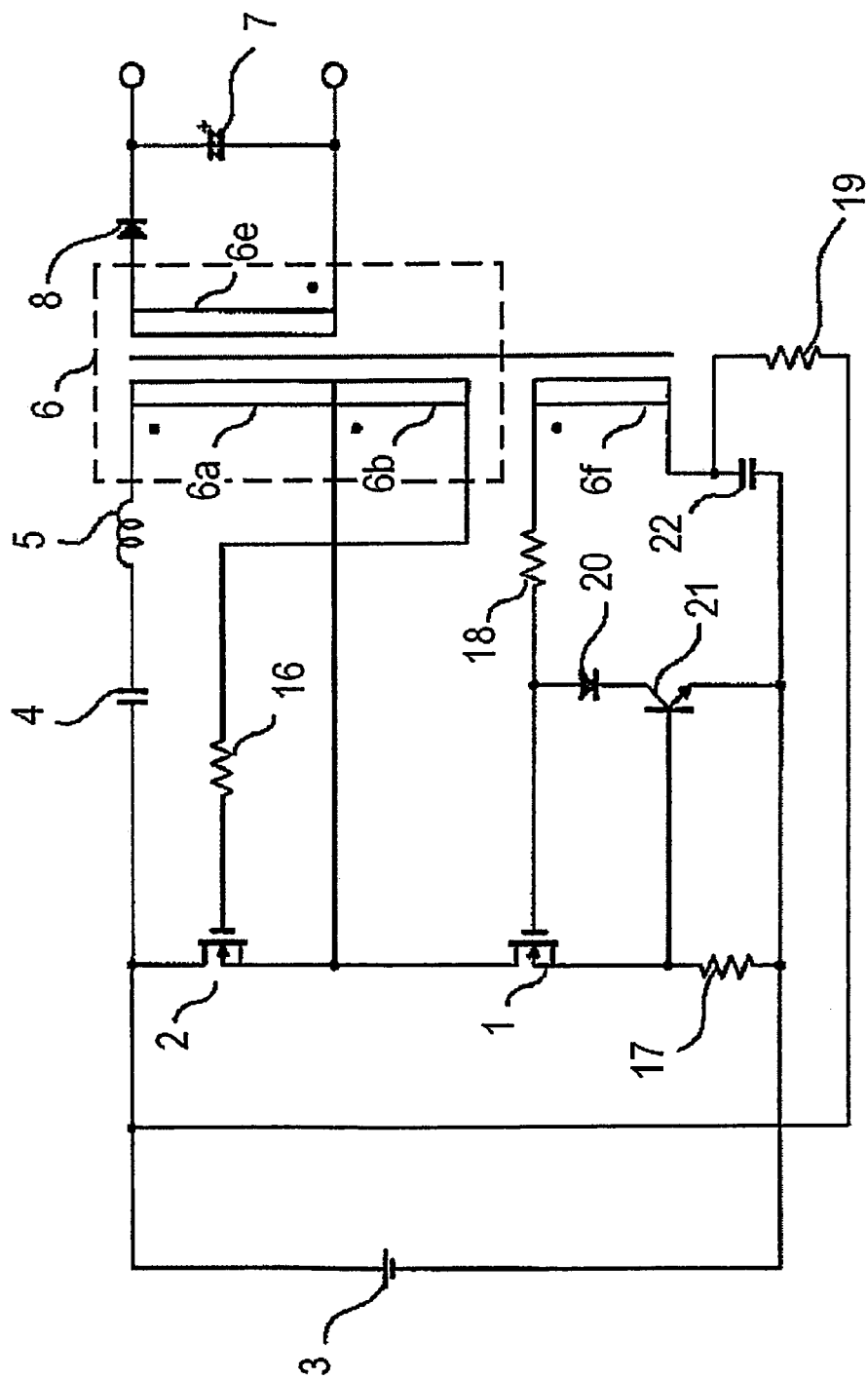
FIG. 5 is a circuit diagram of a conventional electric power converter that obtains a DC output insulated from a DC power supply.
Figure 6:
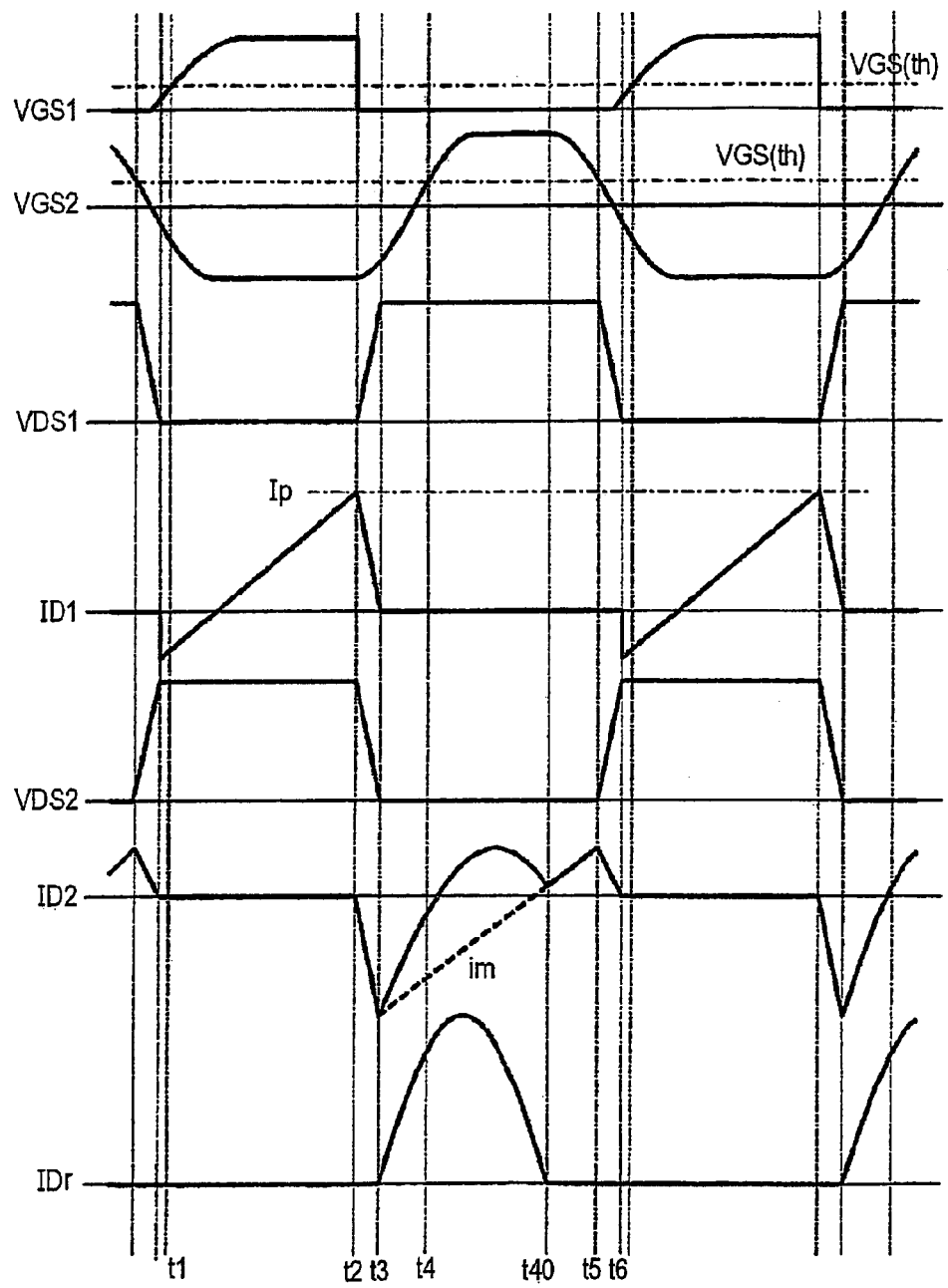
FIG. 6 is a wave chart describing the operations of the circuit shown in FIG. 5.
Figure 7:
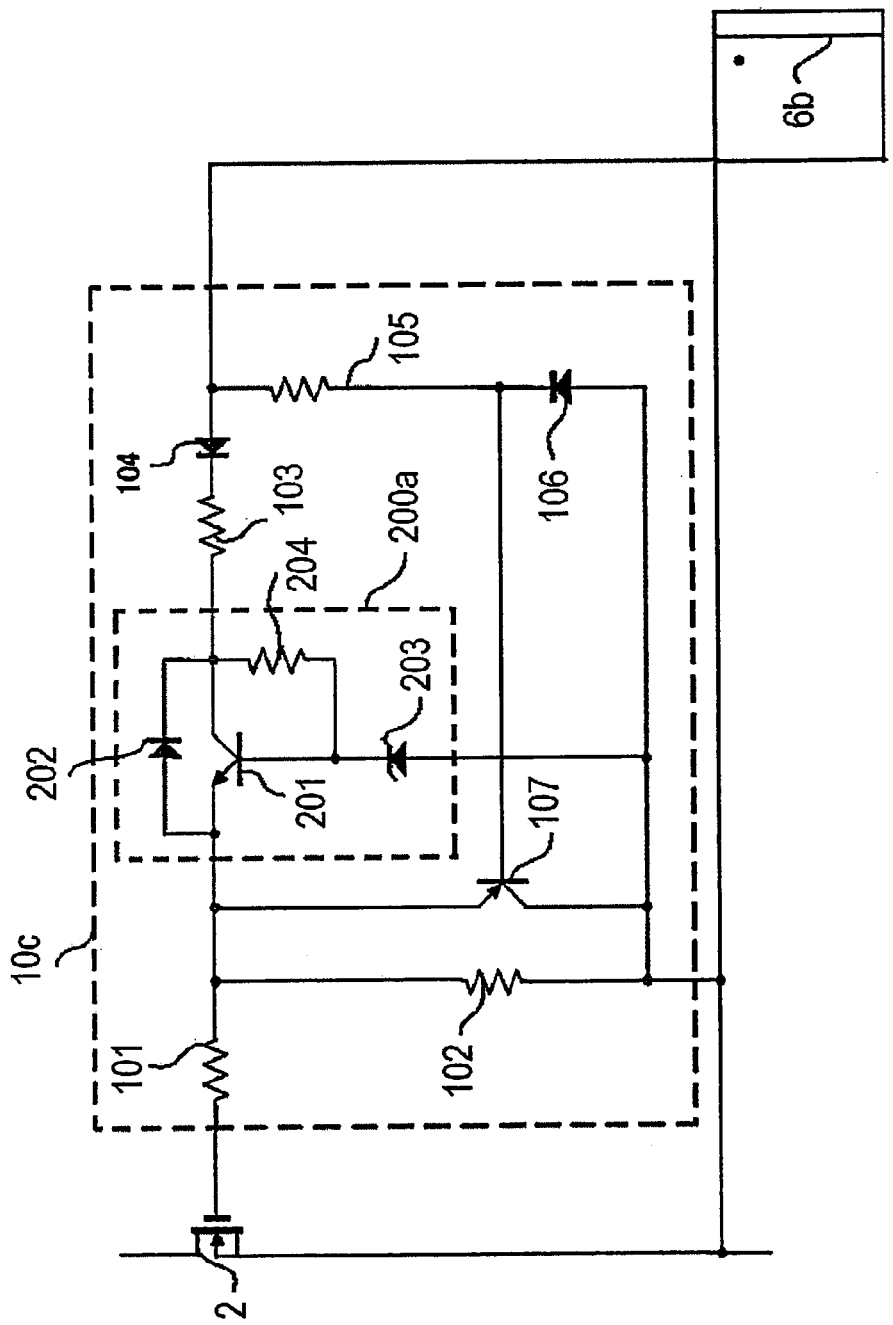
FIG. 7 is a circuit diagram showing an example of a subsidiary control circuit employed in the circuit shown in FIG. 5.

As main switching device 1 is turned OFF in FIG. 1, the voltage across fourth winding 6b changes from negative to positive. A subsidiary control circuit 10 turns subsidiary switching device 2 ON and OFF using the voltage across fourth winding 6b as a switching signal. Thus, main and subsidiary switching devices 1 and 2 are turned ON and OFF alternately. As a result, positive and negative voltages are generated alternately across each winding in transformer 6. For feeding a certain voltage to the load, the voltage of the secondary winding having a center tap structure, and thus constituted by windings 6d and 6e, is full-wave rectified with diodes 8, 9 and capacitor 7 and a certain voltage is fed to the load. Alternatively, the voltage of the secondary winding may be half-wave rectified with no problem. Reactor 5 in FIG. 5 is not shown in FIG. 1, since the leakage inductance of transformer 6 is used in substitution for reactor 5 in FIG. 1.

Figure 2:
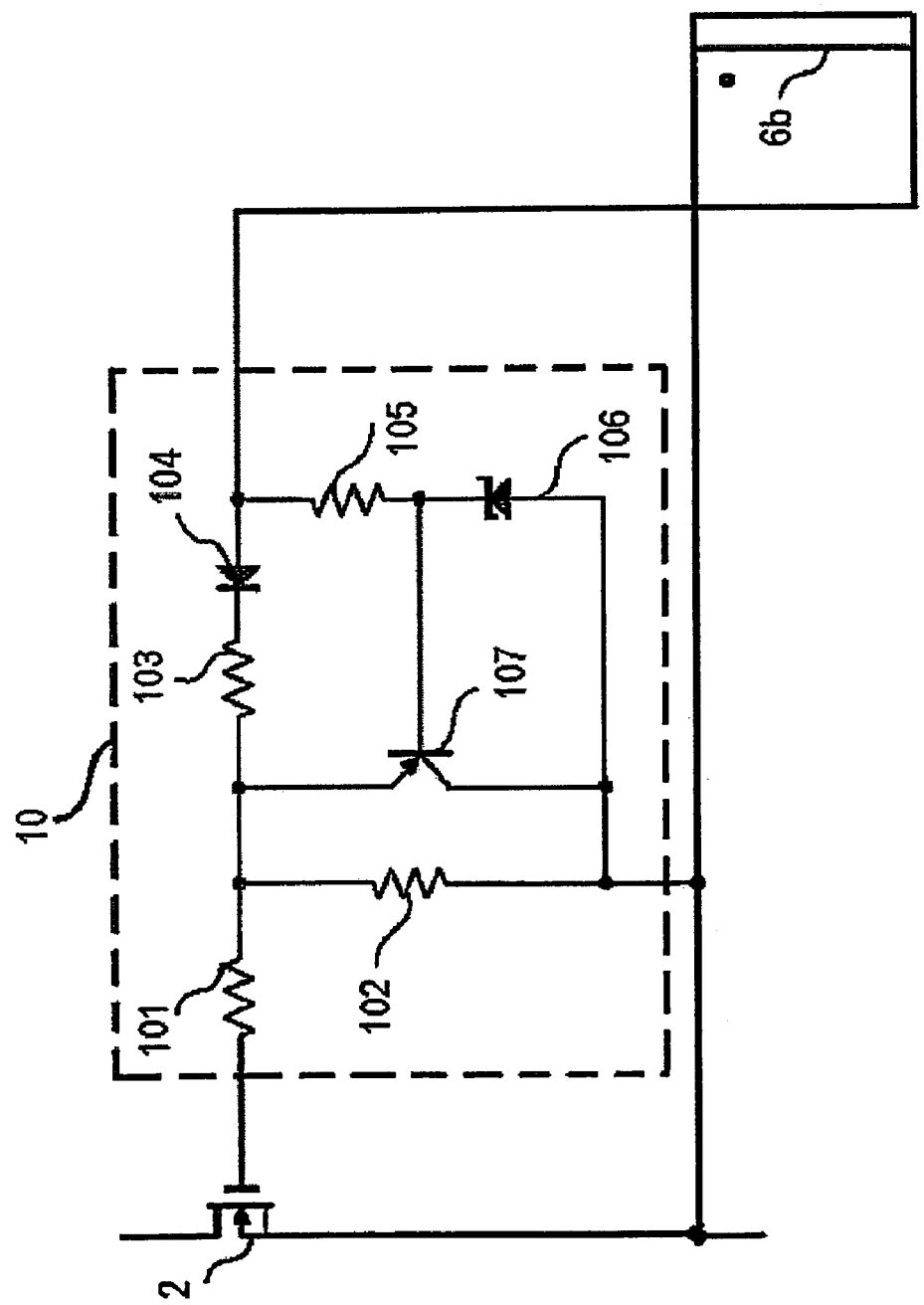
FIG. 2 is a circuit diagram showing the subsidiary control circuit in FIG. 1.

FIG. 2 is a circuit diagram showing the subsidiary control circuit 10 in FIG. 1. Referring now to FIG. 2, the series circuit of a diode 104 and a resistor 103 adjusts the charging speed, at which the gate input capacitance of subsidiary switching device 2 is charged, together with a resistor 101. The series circuit of diode 104 and resistor 103 also controls the ON and OFF of a transistor 107. The series circuit of Zener diode 106 and resistor 105, which is connected to the connection point of the base terminal of transistor 107, adjusts the discharging speed, at which the gate input capacitance of subsidiary switching device 2 is discharged. Thus, the series circuit of Zener diode 106 and resistor 105 also controls transistor 107 so that the voltage between the gate and source of subsidiary switching device 2 may not be negative. It will be appreciated by those skilled in the art that other types of voltage regulator could be employed instead of a Zener diode without departing from the scope of the invention. For example, the voltage regulator could be a voltage regulator IC, or another type of diode with voltage regulating properties. A resistor 102 is a discharging resistor that prevents subsidiary switching device 2 from malfunctioning to be ON due to the voltage between the gate and source of subsidiary switching device 2, which is unstabilized when any voltage is not generated across fourth winding 6b. Alternatively, resistor 102 may be connected in parallel between the gate and source of subsidiary switching device 2 with no problem. When the resistance value of resistor 105 is relatively small, resistor 102 may be omitted with no problem.

Figure 3:
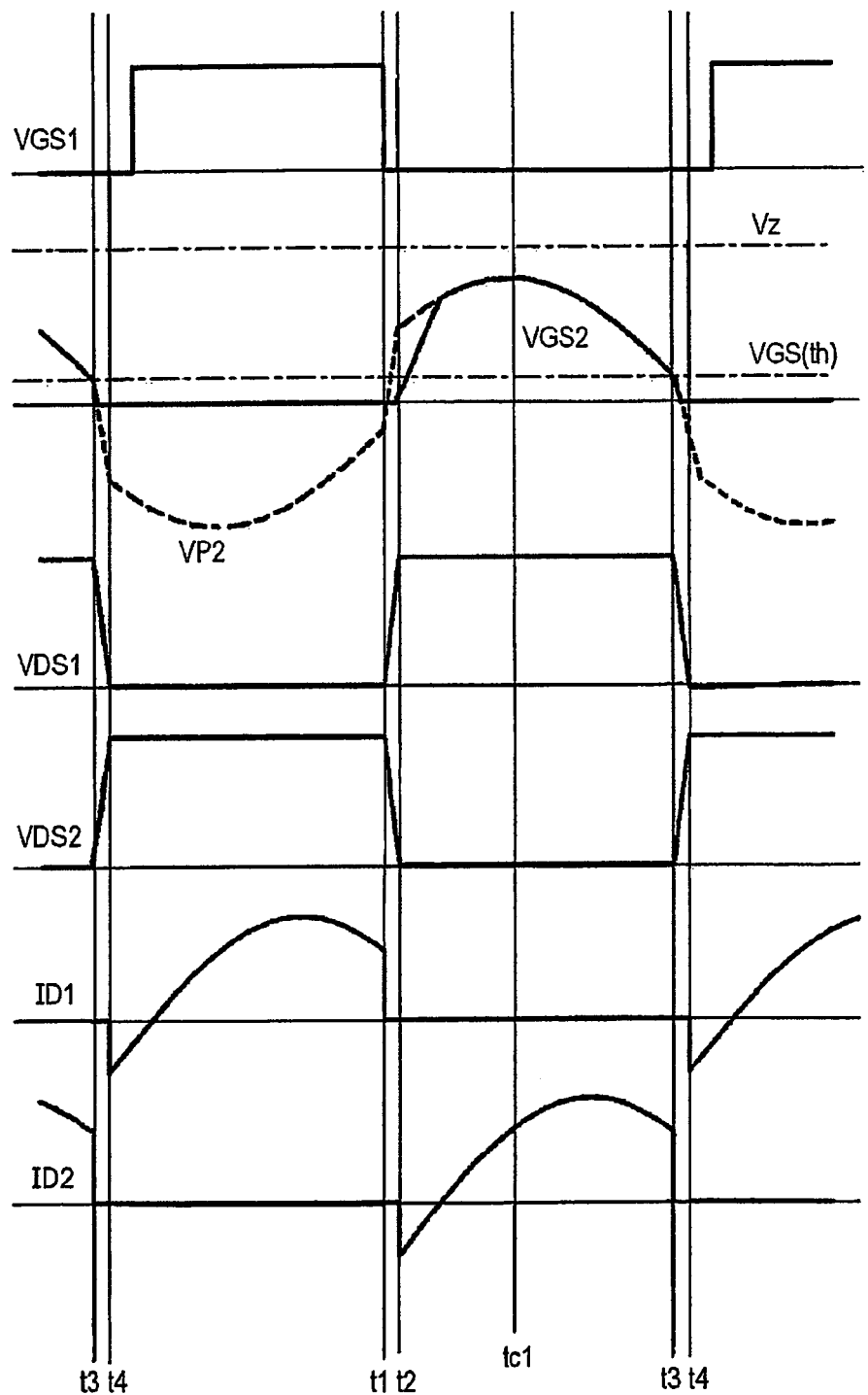
FIG. 3 is a wave chart describing the operations of the switch mode power supply having the circuit configuration shown in FIG. 1, to which the subsidiary control circuit shown in FIG. 2 is applied.

Now the operations of the switch mode power supply having the circuit configuration shown in FIG. 1, to which the subsidiary control circuit shown in FIG. 2 is applied, will be described below with reference also to FIG. 3. In FIG. 3, VGS1, VDS1, and ID1 designate the voltage between the gate and source of main switching device 1 shown in FIG. 1, the voltage between the drain and source thereof, and the drain current thereof, respectively. Likewise, VGS2, VDS2, and ID2 designate the voltage between the gate and source of subsidiary switching device 2, the voltage between the drain and source thereof, and the drain current thereof, respectively. VP2 designates the voltage across fourth winding 6b. VGS(th) is the gate threshold voltage of subsidiary switching device 2. First, the case, in which the voltage across fourth winding 6b in FIG. 1 does not exceed the Zener voltage Vz of Zener diode 106, will be described.

Below, one switching period is divided by time points t1, t2, tc1, t3, and t4 into states 1 through 5 (as referred to below) and the operations in state 1 through state 5 between the adjacent time points will be described as follows.

State 1: t1-t2

As main switching device 1 is turned OFF, VDS1 rises but VDS2 falls. In association with the rise of VDS1, voltage VP2 across fourth winding 6b also rises. As VP2 becomes positive, diode 104 becomes conductive and the gate input capacitance of subsidiary switching device 2 starts being charged with the voltage across fourth winding 6b via diode 104, resistor 103 and resistor 101.

State 2: t2-tc1

As VDS2 becomes zero, the body diode of subsidiary switching device 2 becomes conductive and drain current ID2 thereof flows with negative polarity. The time constant determined by the gate input capacitance value and the series resistance value of resistors 103 and 101 is set at a value at which the gate voltage VGS2 of subsidiary switching device 2 reaches gate threshold voltage VGS(th) within the period for which a current flows through the body diode of subsidiary switching device 2. By setting the time constant as described above, subsidiary switching device 2 is turned ON and conducts when VGS2 is still at zero volts.

State 3: tc1-t3

As the voltage across fourth winding 6b reaches the maximum value, diode 104 is turned OFF, transistor 107 is turned ON in the active region and the gate input capacitance of subsidiary switching device 2 is discharged following the voltage across fourth winding 6b.

State 4: t3-t4

As voltage VGS2 between the gate and source of subsidiary switching device 2 falls below gate threshold voltage VGS(th), subsidiary switching device 2 is turned OFF, VDS2 rises and VDS1 falls. In association with the fall of VDS1, voltage VP2 across fourth winding 6b falls sharply. As a result, the electric charges accumulated in the gate input capacitance of subsidiary switching device 2 are discharged rapidly until VGS2 falls to zero.

State 5: t4-t1

As voltage VP2 across fourth winding 6b becomes negative, Zener diode 106 becomes conductive and the current flowing through resistor 105 is given by dividing voltage VP2 across fourth winding 6b by the resistance value of resistor 105. Since the voltage between the base and emitter of transistor 107 is set almost at zero, transistor 107 is OFF. Therefore, voltage VGS2 between the gate and source of subsidiary switching device 2 keeps being zero. The operations described above are repeated.

Since voltage VGS2 between the gate and source of subsidiary switching device 2 is zero in the period in which voltage VP2 across fourth winding 6b is negative, voltage VGS2 between the gate and source of subsidiary switching device 2 never exceeds the negative gate breakdown voltage to the negative side. The current fed from fourth winding 6b in the period described above is limited by the resistance of resistor 105. It is enough for resistor 105 to exhibit a resistance value that can make a current of around several mA flow to the base of transistor 107. Since the resistance value of resistor 105 that meets the requirement described above is from several kΩ to several tens kΩ, the losses caused are small. Therefore a Zener diode exhibiting a small capacitance value can be employed for Zener diode 106.

Figure 4:
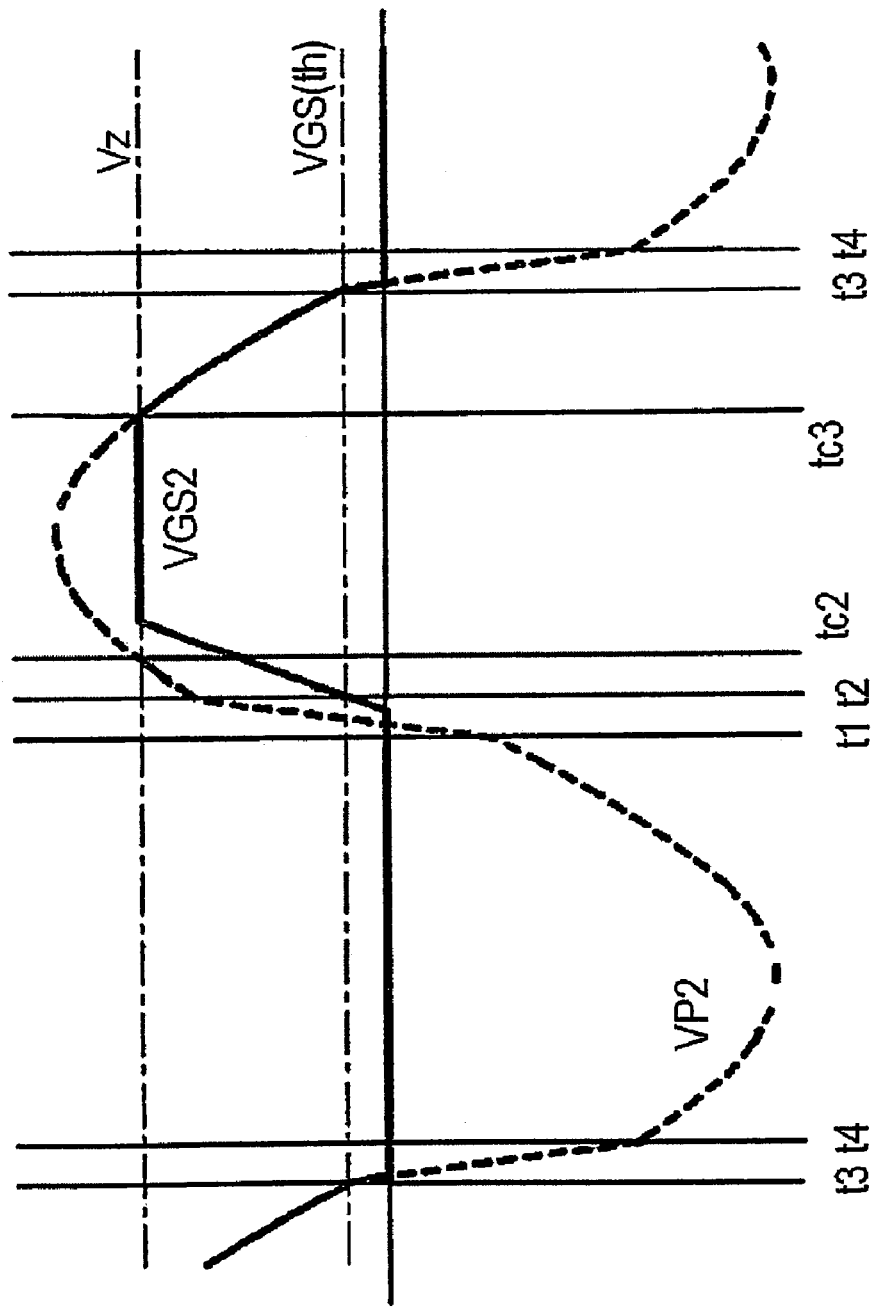
FIG. 4 is a wave chart describing the clamping operations of the subsidiary switching device in FIG. 2.

Now the operations in the case in which the voltage across fourth winding 6b exceeds the Zener voltage Vz of Zener diode 106 will be described below with reference to FIG. 4. In the period between the time points tc2 and tc3 in FIG. 4, in which the voltage across fourth winding 6b exceeds Zener voltage Vz, transistor 107 is turned ON in the active region so that transistor 107 may work to set the voltage between the gate and source of subsidiary switching device 2 at Zener voltage Vz. In this operation, the current flowing through Zener diode 106 is limited by resistor 105. As described above, the resistance value of resistor 105 is from several kΩ to several tens kΩ. Since a Zener diode exhibiting a small capacitance value and excellent constant voltage characteristics can be employed for Zener diode 106, the voltage between the gate and source of subsidiary switching device 2 can be clamped very accurately.

While the present invention has been particularly shown and described with reference to a preferred embodiment thereof, it will be understood by those skilled in the art that the foregoing and other changes in form and details can be made therein without departing from the spirit and scope of the invention.

What is claimed is:

1. A switch mode power supply comprising:
a first series circuit connected between positive and negative electrodes of a DC power supply, the first series circuit including a main switching device and a subsidiary switching device connected in series with each other;
a transformer including a first winding on a primary side thereof and a second winding on a secondary side thereof, the first winding being disposed between the positive electrode of the DC power supply and a connection point of the main switching device and the subsidiary switching device;
a rectifying and smoothing circuit, the second winding being connected to a load via the rectifying and smoothing circuit;
a main control circuit to controllably turn the main switching device ON and OFF;
a subsidiary control circuit to controllably turn the subsidiary switching device ON and OFF;
the main control circuit and the subsidiary control circuit turning the main switching device and the subsidiary switching device ON and OFF alternately to convert a second winding voltage generated across the second winding to a DC electric voltage via the rectifying and smoothing circuit and to feed the DC electric voltage to the load;
the transformer further including a third winding and a fourth winding on the primary side thereof;
the main control circuit employing a third winding voltage generated across the third winding as a signal voltage to turn the main switching device ON and OFF, whereby the DC electric voltage fed to the load is set at a predetermined value; and
the subsidiary control circuit including a transistor and a voltage regulator, the subsidiary control circuit controlling the transistor to apply to a control terminal of the subsidiary switching device a lower one of a fourth winding voltage generated across the fourth winding and a regulation voltage of the voltage regulator, the lower one of the fourth winding voltage and the regulation voltage being equal to or higher than zero volts.

2. The switch mode power supply according to claim 1, wherein the transformer is an insulated transformer.

3. The switch mode power supply according to claim 1, further comprising a second series circuit connecting the first winding to the positive electrode, the second series circuit including a capacitor.

4. The switch mode power supply according to claim 3, wherein the second series circuit further includes a reactor in series with the capacitor.

5. The switch mode power supply according to claim 3, wherein the second series circuit includes a leakage reactance of the transformer in series with the capacitor.

6. The switch mode power supply according to claim 1, wherein the main control circuit employs the DC electric voltage as a control power supply.

7. The switch mode power supply according to claim 1, wherein the voltage regulator is a Zener diode.

* * * * *